Patented Aug. 26, 1952

2,608,566

UNITED STATES PATENT OFFICE 2,608,566

PROCESS FOR DECOLORIZING A SOYBEAN OIL MISCELLA

Ralph A. Marmor and Wendell W. Moyer, Decatur, Ill., assignors to A. E. Staley Manufacturing Company, Decatur, Ill., a corporation of Delaware No Drawing. Application June 17, 1947, Serial No. 755,253

2 Claims. (Cl. 260—427)

This invention relates to improvements in the manufacture of glyceride oils. More specifically, it pertains to improvements in the production of solvent extracted crude glyceride oils which, when refined by conventional methods and utilizing novel low temperature removal of solvent combined with a decolorizing step, yield refined oils of superior qualities.

A primary object of the invention is to provide for the production of glyceride oils having improved color, flavor, odor, and resistance to reversion and development of oxidative rancidity during storage.

Another object of the invention is to provide a novel treatment of the oil prior to conventional refining operations while using alkalies and elevated temperatures such that the refined oil is markedly improved with respect to color, flavor, odor, and resistance to reversion and development of oxidative rancidity during storage.

A further object of the invention is to eliminate the need for treating the oil with color adsorbents after the customary alkali treatment to remove gums and acids.

Another object of the invention is to provide for the production of partially refined solvent extracted glyceride oils having improved color, flavor, and odor.

Additional objects of the invention will be apparent from the following description and claims.

The invention accordingly comprises the several steps and the relation of one or more of such steps with respect to each of the others thereof, which will be exemplified in the process hereinafter disclosed, and the scope of the application of which will be indicated in the claims.

Nearly all refined glyceride oils of edible grade develop some undesirable flavor or odor during prolonged storage. The degree to which this occurs depends upon the kind of oil, the nature of the refining process, and the conditions of storage. Other conditions being equal, the more saturated the oil the more stable it is, in general, to storage. Light and oxygen generally accelerate the deterioration of the stored oil. Frequently, the refined oil, either as such or as an hydrogenated oil, is stored as an ingredient of a foodstuff, such as margarine, salad dressing, and shortening. Obviously, any appreciable development of rancidity or other off-flavor or odor in such foodstuff is highly undesirable.

Owing to such deterioration during storage, some readily available glyceride oils are not as widely used in the preparation of the above mentioned foodstuffs as they would be if their freshly refined qualities could be maintained during a reasonable period of storage. For example, conventional freshly refined soybean oil is an excellent edible oil. Without further treatment, it is quite suitable for the preparation of salad dressings, and when properly hydrogenated it makes an excellent shortening and margarine oil. The flavor and odor stability characteristics of the conventional refined soybean oil, however, are less than those of other competitive edible oils. The refined oil, either alone or in combination with other food materials, rather rapidly develops substantial oxidative rancidity and noticeable flavor reversion. The rancidity is measurable as a peroxide value. To prevent this, so as to permit use of the refined oil in foodstuffs, it has heretofore been necessary either to give the oil an additional and special refining treatment or to treat it with suitable stabilizers.

The present invention provides a process for the preparation of refined solvent extracted soybean oil and other glyceride oils which are sufficiently stable to be used in stored foodstuffs without additional refining or treatment with stabilizers. This is accomplished by separating the solvent and oil at temperatures substantially below those used heretofore and subjecting the oil to the action of a color adsorbent prior to other refining operations. The order in which the solvent is removed and the oil is contacted with a color adsorbent does not materially affect the qualities of the final oil. We prefer to treat the solution of oil in solvent, either as a full or partial miscella, with the color adsorbent first, mainly because such solutions are less viscous than the undiluted oil and are more easily percolated or filtered through a bed of the adsorbent material. However, the advantages of this invention can be obtained by first evaporating the solvent from the extracted oil at low temperatures, and then contacting the oil with a color adsorbent, either in the absence or presence of a diluent.

We have discovered that conventional refining of solvent extracted glyceride oils yields final oils of markedly superior qualities if, prior to any other conventional refining operations, the oil is contacted with a color adsorbent and the solvent is removed from the oil, both operations being accomplished at temperatures not exceeding about 50° C. It is the combination of low temperature solvent removal and color adsorbent treatment, prior to other refining operations, that is important. As mentioned earlier, the order in which the two steps of the combination are performed has no appreciable effect on the quality of the final oil. Prevention of thermal degradation of the color bodies and other materials are believed to be responsible for stability characteristics of the oil. The qualities of the oil that are markedly improved by our invention are those of color, flavor, odor and stability towards reversion and development of oxidative rancidity during storage. We have also found that the decolorized crude oil obtained in accordance with our invention is very light colored and possesses excellent flavor and odor.

The combination of low temperature separation of solvent from oil and contacting of the oil with a color adsorbent, prior to other refining operations, is particularly beneficial when subsequent refining of the crude oil includes an alkali treatment. Substantial improvements in the quality of the final product are provided by this combination, however, even though subsequent refining operations do not include an alkali treatment.

The currently preferred solvent for the commercial extraction of glyceride oils is so-called hexane, a high test gasoline boiling over a range of about 63° to 70° C. Such solvents as trichloroethylene, benzene, and ethanol, all having boiling points under 90° C., are also used.

Briefly reviewing the solvent extraction of oil from a raw material, such as soybeans for example, the usual commercial practice is to flake the cracked beans and then leach the oil from them with hexane solvent. This is accomplished either by percolating the solvent through a stationary bed of the flakes, or by washing the flakes countercurrently with the solvent in a special apparatus. The solution of oil in hexane, known as full miscella and commonly containing about three parts of solvent to one part oil, is distilled at atmospheric pressure to remove most of the solvent from the oil. Temperatures attained by the oil-solvent mixture in this operation conventionally range from about 60° to 90° C. The solvent remaining in the oil is then removed under vacuum at temperatures ranging from about 100° to 120° C.

The crude oil obtained as described above is then refined or purified. The chief impurities in crude soybean oil, as well as crude glyceride oils in general, are gummy materials, consisting mainly of phosphatides and free fatty acids. Impurities present in lesser proportions are color bodies, waxes, unidentified disagreeable odorous constituents, sterols, and other materials. The gummy materials and free fatty acids are conveniently and commonly removed by stirring the warm crude oil vigorously with a proportion of moderately strong aqueous solution of caustic soda slightly in excess of that required to combine with the acidic impurities, and then separating the oily and aqueous phases either by gravity settling and decantation or by centrifuging. The aqueous phase carries with it the gums and free fatty acids, the former as an intimately dispersed and partially saponified material, and the latter as a solution or dispersion of the sodium salts or soaps. Residual soap and free alkali in the separated oil are removed by washing the oil with water. The next conventional refining operation is bleaching or decolorizing to reduce the color of the crude oil. This usually consists of stirring the warm oil with a color adsorbent such as activated carbon, alumina, magnesia, clay, etc., and filtering the mixture to remove the adsorbent and adsorbed impurities. Any of the conventional oil color adsorbents are suitable. Following this, the oil is winterized, i. e., stored at low temperatures and then filtered to remove precipitated solids, if the oil is to be used under temperature conditions likely to cause separation of waxes and other high melting constituents. The final steps in the conventional refining of crude glyceride oils are deodorization and check filtration. Deodorization usually consists of passing superheated steam through the hot oil under high vacuum. This treatment removes disagreeable odorous constituents of the oil remaining from the preceding refining operations.

There are many known variations of the above described process for refining crude glyceride oils. For example, the crude oil may be degummed before it is treated with alkali. This usually consists of vigorously stirring the warm oil with about two or three per cent of an aqueous medium, consisting optionally of water alone, dilute acid, dilute alkali, or salt solution, which hydrates the gum or phosphatides and precipitates them from the oil, and then separating gum from oil, either by gravity settling and decantation or by centrifuging. The degumming may be performed on the crude oil alone or on the oil dissolved in some solvent. Too much solvent, however, interferes somewhat with separation of the hydrated gum. Other alkalies or alkaline materials may be substituted for the caustic soda in the alkali treatment. In some instances, where water degumming is employed, the alkali treatment is eliminated. In others, the order of bleaching, winterizing (if used) and deodorization described above is altered. Regardless of the manner in which the glyceride oil is conventionally refined, prior low temperature contact of the oil with a color adsorbent and low temperature removal of solvent from oil in accordance with our invention will markedly improve the quality of the refined oil.

In the preferred practice of our invention, the full miscella is stirred with a color adsorbent at temperatures not exceeding about 50° C. until color adsorption reaches substantial equilibrium. This usually does not require more than about one hour. The mixture is then filtered to remove the adsorbent, and the filtrate is evaporated under reduced pressure and at a maximum temperature of 50° C. until no more than about one or two per cent of solvent remains in the oil. The vaporized solvent may be recovered by conveying it to an efficient surface condenser. We have observed that removal of the last few per cent of solvent from the oil at temperatures not exceeding about 50° C. is slow, even though very low pressures be used. It is, therefore, advantageous to leave about one per cent or so of solvent in the oil, this percentage being based on the oil and not on the solvent initially present in the miscella. This residual solvent is completely removed in the subsequent refining operations, and it does not interfere with those operations. Loss of such residual solvent is not uneconomical when it is compared with the benefits of the invention.

Next the decolorized and low solvent-content oil is degummed with water in a conventional manner, preferably, however, at temperatures not exceeding about 50° C. Following this the oil is alkali refined in a conventional manner. The crude phosphatidic gum obtained in the first operation is much lighter colored than usual. This is due in part to the prior decolorizing treatment and in part to the low temperature removal of solvent from the oil.

The following examples will more fully illustrate the invention:

Example 1

Six liters of a full miscella consisting of about one part soybean oil and three parts hexane was agitated with about 30 grams of an acid activated bleaching clay for about one hour at 25° to 30° C. The mixture was filtered to remove the clay and the noticeably decolorized filtrate was vacuum distilled at a maximum temperature of about 50° C. until the residual oil contained only about two per cent hexane. This oil was next stirred vigorously at 50° C. with about two per cent water and allowed to stand until the hydrated gums settled out. The supernatant oil was decanted from the gums and alkali refined in conventional manner at a maximum temperature of 70° C. using a 0.25 per cent excess of aqueous 16° Baumé sodium hydroxide solution. The soapstock was allowed to settle by gravity from the alkali treated oil. The supernatant oil was decanted from the foots, washed with water to remove traces of soaps and free alkali, and then deodorized by vacuum steam distillation with superheated steam in a conventional manner.

Example 2

Same as Example 1 except that the acid activated clay was replaced with an activated vegetable carbon.

Example 3

Same as Example 1 except that the acid activated clay was replaced with an activated adsorbent grade of magnesia.

Example 4

Same as Example 1 except that the acid activated clay was replaced with an activated adsorbent grade of alumina.

Example 5

Six liters of a full miscella consisting of about one part soybean oil and three parts hexane was agitated with 0.02 part of an acid activated clay for about one hour at 25° to 30° C. The mixture was filtered to remove the clay, and the noticeably decolorized filtrate was vacuum distilled at a maximum temperature of about 50° C. until the residual oil contained only about two per cent hexane. This oil was next alkali refined in conventional manner at a maximum temperature of 70° C. using a 0.25 per cent excess of aqueous 16° Baumé sodium hydroxide solution. The soapstock was allowed to settle by gravity from the alkali treated oil. The supernatant oil was decanted from the soapstock, washed with water to remove traces of soap and free alkali, and then deodorized by vacuum steam distillation with superheated steam in a conventional manner.

Example 6

Same as Example 5 except that the acid activated clay was replaced with an activated vegetable carbon.

Example 7

Same as Example 5 except that the acid activated clay was replaced with an activated magnesia.

Example 8

Same as Example 5 except that the acid activated clay was replaced with an activated alumina.

Example 9

Same as Example 2 except that the soybean oil was replaced with corn oil.

Example 10

Same as Example 6 except that the soybean oil was replaced with corn oil.

Samples of the refined oils obtained in the foregoing examples were stored in diffused light at 25° to 30° C. Control samples of the refined oils were stored under the same conditions. The controls were prepared as described in the examples except that the solvent was removed from the oil at the conventional higher temperatures of about 60° to 100° C., and the oil was decolorized after the alkali treatment instead of before it. Comparisons were made immediately and after 21 days storage of color, odor, flavor, and peroxide value. In every instance it was found that the color, flavor, odor at room temperature, odor at 426° F., and resistance to reversion and development of oxidative rancidity of the oils treated as described in the examples above were markedly superior to those properties of the corresponding controls. Samples of the crude decolorized oils obtained in the foregoing examples were also compared immediately with the crude controls for flavor, color and odor. The results tabulated below for Example 1 and its controls are illustrative of the results obtained in the other examples:

| Bleaching of Miscella plus Low Temperature Removal of Solvent | Treated Oil | |
| --- | --- | --- |
| | Example 1 | Control 1 |
| Immediate Color | 5y-0.5R | 10y-1.0R. |
| Immediate Flavor | v. f. nutty | trace raw. |
| Immediate Odor | Practically none | trace bean. |
| Immediate Heat Odor | Fairly mild | Sharp and grassy. |
| Immediate Peroxide Value | 0.10 | 0.10. |
| Color after 21 days' storage | | |
| Flavor after 21 days' storage | v. f. oxidized | trace paint. |
| Odor after 21 days' storage | v. f. oxidized | trace paint. |
| Heat Odor after 21 day's storage | sl. strong | strong paint or soybean reversion. |
| Peroxide Value after 21 days' storage | 3.14 | 4.76. | v. f. = very faint.
sl. = slightly.

It will be evident from the foregoing examples that the application of our invention to the production of refined solvent extracted glyceride oils yields refined oils of superior qualities. Although the examples are limited to soybean and corn oils, the preparation of other refined solvent extracted glyceride oils in accordance with the principles of our invention is attended by similar benefits.

Any adsorbent material that will remove a substantial proportion of the color bodies from the glyceride oil is suitable for the purposes of our invention. It is to be understood that many different kinds of such adsorbent materials are known, and that our invention is not limited to use of the particular adsorbents cited in the foregoing examples.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In the process of refining soybean oil obtained by extracting the oil from soybeans with hexane solvent, the improvement comprising the sequential steps of contacting the extract with a color adsorbent at a temperature below about 50° C., and subsequently removing the solvent from the extract by vacuum distillation at a temperature below about 50° C., before any additional refining steps.

2. The improvement called for in claim 1 wherein said vacuum distillation step is terminated so as to leave a residue of approximately 1% of the solvent in said soybean oil, based on the weight of the oil.

RALPH A. MARMOR.
WENDELL W. MOYER.

REFERENCES CITED

The following references are of record in the file of this patent:

UNITED STATES PATENTS

| Number | Name | Date |
|---|---|---|
| 88,222 | Sim et al. | Mar. 23, 1869 |
| 913,751 | Mills | Mar. 2, 1909 |
| 1,745,851 | Hamilton et al. | Feb. 4, 1930 |
| 2,292,822 | Clayton | Aug. 11, 1942 |
| 2,461,751 | Marmor et al. | Feb. 15, 1949 |

OTHER REFERENCES

Buxton: Industrial & Eng. Chemistry, December 1942, vol. 34, No. 12, pp. 1486–7.